Patented Nov. 5, 1929

1,734,559

UNITED STATES PATENT OFFICE

LUIGI CASALE, DECEASED, LATE OF ROME, ITALY, BY MARIA CASALE-SACCHI, ADMINISTRATRIX, OF RAPALLO-GENOA, ITALY

PROCESS FOR THE PREPARATION OF MIXTURES OF CARBON MONOXIDE AND HYDROGEN FROM HYDROCARBONS

No Drawing. Application filed April 14, 1927, Serial No. 183,925, and in Italy April 20, 1926.

This invention relates to improvements in processes for the preparation of mixtures of carbon monoxide and hydrogen, and of hydrogen alone, and of mixtures of hydrogen and nitrogen, from hydrocarbons.

Almost all the hydrocarbons, when brought to temperatures above 1000° C., are more or less rapidly decomposed into carbon, hydrogen and methane. The latter also decomposes, but with more difficulty, so that finally almost exclusively carbon and hydrogen are obtained. When a mixture of hydrocarbons and water is brought to the said temperature, it decomposes analogously, but with the difference that, instead of carbon and hydrogen, the end-product consists of carbon monoxide and hydrogen, the amount of the latter being of course increased because of water decomposition. The two said reactions are endothermic, particularly the second. On the basis of these reactions various methods for preparing hydrogen have been proposed; but the difficulty of economically performing endothermic reactions at such high temperatures has hitherto prevented the industrial success of such methods.

Dieffenbach and Moldenhauer (German Patent No. 229,406 of 1909) with the aim of making this reaction more practicable, proposed to add to the mixture of hydrocarbons and water, oxygen or air in sufficient quantity to render the reaction exothermic. Soon afterwards the Badische Anilin- and Soda-Fabrik (German Patent No. 296,866 of 1912) proposed to employ nickel oxide or nickel on a refractory support to bring about the reaction at temperatures of 800–1000° C.

In spite of the great practical importance of the problem, especially for the production of hydrogen from coke-oven gases, these methods, as well as other analogous ones, have not yet been industrially applied.

In the thermic decomposition of hydrocarbons, as above mentioned, carbon, hydrogen and methane form the intermediate products: the methane is the last to disappear.

Thus, in the decomposition in presence of water the most important reaction to render rapid and complete is:

$$CH_4 + H_2O = CO + 3H_2$$

For the equilibrium-constant

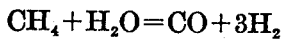

the calculation gives the following values (H. S. Taylor—Industrial Hydrogen, page 151)

T° abs.= 500°    800°   1000°   1500°
Kp    =4×10⁻¹¹  0.03    35      6×10⁵

Now the industrial success of this process depends on the purity of the hydrogen produced and on the facility of a large production. This renders necessary the complete decomposition of the methane and an enormous velocity in the reaction chamber. In other words, industrial success will be attained only when in the reaction chamber conditions are realized under which the value of concentration of the methane is practically nil, even when this value has reached only a fraction, for example ⅓–¼ of the value corresponding to the equilibrium.

It has been found that these conditions are realized when in the reaction chamber the system of the reacting gases (a) Is maintained, at low pressure, always below atmospheric pressure;

(b) Attains a temperature above 1000° C., even when the reaction occurs in the presence of catalysts;

(c) Contains a large excess of water over and above that entering into reaction.

An explanation of the first condition is unnecessary because of the great increase in the volume caused by the reaction, while the second and third conditions can be easily derived from the equilibrium-constant referred to above.

The final gas obtained in accordance with the process of this invention is practically free from methane and is composed of a mixture of hydrogen and carbon monoxide.

After suitable corrections, the mixture can be employed in the synthesis of alcohols.

If, immediately after the reaction, the mixture is cooled to about 500° C. by addition of water or steam, it is ready for the catalytic conversion:

$$CO + H_2O = CO_2 + H_2$$

This conversion can be performed using one of the known methods, for instance, causing the gaseous mixture issuing from the apparatus in which the decomposition of hydrocarbons occurs to pass over a catalyst consisting of an iron-chromium oxide heated to 400–450° C., having, as stated, previous added steam in a quantity exceeding the quantity of carbon monoxide contained in said mixture.

The carbon dioxide formed can be separated by means of one of the known methods, for instance, subjecting the gaseous mixture of hydrogen and carbon dioxide to compression, or by passing the same into a column containing a sodium hydroxide solution, or by washing with water under pressure in towers.

In this case the end-product freed from carbon dioxide can be used in ammonia synthesis or in other hydrogenations.

When, instead of pure oxygen, air or air enriched with oxygen is used, it is possible to obtain an end-product consisting of the hydrogen-nitrogen mixture such as it is required in the synthesis of ammonia.

Having now particularly described and ascertained the nature of the said invention and in what manner the same is to be performed, I declare that what is claimed is:

1. A process for the production of mixtures of hydrogen and carbon monoxide free from methane from hydrocarbons and water or gaseous mixtures containing hydrocarbons, oxygen and water, in which the reaction between the said substances is carried out at a temperature above 1000° C. in the presence of an excess of water and at a pressure below that of the atmosphere.

2. A process for the production of hydrogen free from methane from hydrocarbons and water or gaseous mixtures containing hydrocarbons, oxygen and water, in which the reaction between the said substances is carried out at a temperature above 1000° C. in the presence of an excess of water and at a pressure below that of the atmosphere, converting catalytically with steam the mixture of hydrogen and carbon monoxide into hydrogen and carbon dioxide and freeing the resultant mixture from carbon dioxide.

3. A process for the production of mixtures of nitrogen and hydrogen from hydrocarbons, water, and air in which the reaction between said substances is carried out at a temperature above 1000° C. in the presence of an excess of water and at a reduced pressure, converting the carbon monoxide thus formed into carbon dioxide, removing said carbon dioxide to leave a gaseous mixture of nitrogen and hydrogen.

4. A process for the production of mixtures of nitrogen and hydrogen as claimed in claim 3, in which air enriched with oxygen is used.

In witness whereof I have hereunto set my signature.

MARIA CASALE-SACCHI,
*Administratrix of Luigi Casale, Deceased.*